United States Patent
Gomez et al.

(10) Patent No.: US 9,686,594 B2
(45) Date of Patent: Jun. 20, 2017

(54) SPECTRUM ANALYSIS AND PLANT DIAGNOSTIC TOOL FOR COMMUNICATIONS SYSTEMS

(75) Inventors: Ramon Alejandro Gomez, San Juan Capistrano, CA (US); Leonard Dauphinee, Irvine, CA (US); Donald G. McMullin, Laguna Hills, CA (US); Harold Raymond Whitehead, Duluth, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 77 days.

(21) Appl. No.: 13/435,433

(22) Filed: Mar. 30, 2012

(65) Prior Publication Data

US 2013/0125183 A1   May 16, 2013

Related U.S. Application Data

(60) Provisional application No. 61/558,735, filed on Nov. 11, 2011, provisional application No. 61/584,476, filed on Jan. 9, 2012.

(51) Int. Cl.
*G01R 31/08* (2006.01)
*H04N 21/647* (2011.01)
(Continued)

(52) U.S. Cl.
CPC ....... *H04N 21/64723* (2013.01); *H04L 43/12* (2013.01); *H04N 17/00* (2013.01); *H04L 41/32* (2013.01)

(58) Field of Classification Search
CPC .. H04N 21/64723; H04N 17/00; H01L 43/12; H01L 41/32
See application file for complete search history.

(56) References Cited

U.S. PATENT DOCUMENTS 5,086,475 A * 2/1992 Kutaragi et al. ............. 704/265
5,099,493 A * 3/1992 Zeger et al. .................. 370/342
(Continued)

FOREIGN PATENT DOCUMENTS

CN   101523882 A   9/2009

OTHER PUBLICATIONS

Data-Over-Cable Service Interface Specifications, DOSIS 3.0, MAC and Upper Layer Protocols Interface Specification, CM-SP-MULPIv3.0-I16-110623, dated Jun. 23, 2011; 768 pages.

(Continued)

*Primary Examiner* — Robert Wilson
(74) *Attorney, Agent, or Firm* — Sterne, Kessler, Goldstein & Fox P.L.L.C.

(57) ABSTRACT

A system, method, and apparatus to allow an operator of a broadcast communication system, such as a cable television or satellite television service to provide some examples, to diagnose performance of this communication system remotely. The operator of a first communication device, such as a cable modem termination system (CMTS) to provide an example, may remotely diagnosis performance problems, or potential performance problems, occurring at a second communication device, such as a cable modem (CM) to provide an example, or a group of second communication devices. For example, the operator of the first communication device may view a spectrum analysis of communication signals being routed to, processed by, and/or provided by the second communication device, or group of second communication devices, to diagnose the performance problems, or the potential performance problems, in real time.

41 Claims, 5 Drawing Sheets

(51) Int. Cl.
*H04N 17/00* (2006.01)
*H04L 12/26* (2006.01)
*H04L 12/24* (2006.01)

(56) References Cited

U.S. PATENT DOCUMENTS

| | | | |
|---|---|---|---|
| 5,465,270 A * | 11/1995 | Beauducel et al. | 375/242 |
| 5,579,316 A * | 11/1996 | Venters et al. | 370/392 |
| 5,970,069 A * | 10/1999 | Kumar | H04L 69/12 |
| | | | 370/401 |
| 6,404,825 B1 * | 6/2002 | Efstathiou | 375/326 |
| 6,662,338 B1 * | 12/2003 | Rezzi et al. | 714/795 |
| 6,724,841 B2 * | 4/2004 | Piirainen | 375/346 |
| 6,868,072 B1 * | 3/2005 | Lin et al. | 370/276 |
| 6,999,501 B1 * | 2/2006 | Sawyer | H04B 1/71072 |
| | | | 370/333 |
| 7,302,379 B2 * | 11/2007 | Cioffi et al. | 703/20 |
| 7,586,924 B2 * | 9/2009 | Wiegand | 370/395.64 |
| 7,593,833 B2 * | 9/2009 | Savoor et al. | 702/186 |
| 7,602,716 B1 * | 10/2009 | Thippeswamy | H04L 12/2801 |
| | | | 370/235 |
| 7,809,116 B2 * | 10/2010 | Rhee et al. | 379/1.04 |
| 7,924,736 B2 * | 4/2011 | Cioffi et al. | 370/252 |
| 8,050,235 B2 * | 11/2011 | Kang et al. | 370/333 |
| 8,068,584 B2 * | 11/2011 | Wu et al. | 379/1.04 |
| 8,144,835 B2 * | 3/2012 | Wu et al. | 379/1.04 |
| 8,165,168 B2 | 4/2012 | Lusky et al. | |
| 8,228,909 B2 * | 7/2012 | Park | H04L 69/22 |
| | | | 370/389 |
| 8,275,183 B2 * | 9/2012 | Kadir et al. | 382/128 |
| 8,300,731 B2 | 10/2012 | Cowley et al. | |
| 8,325,622 B2 * | 12/2012 | Feldbauer et al. | 370/252 |
| 8,396,500 B2 * | 3/2013 | Fujita et al. | 455/513 |
| 8,644,169 B2 | 2/2014 | Cioffi et al. | |
| 2003/0070175 A1 | 4/2003 | Panabaker | |
| 2003/0182664 A1 * | 9/2003 | Lusky | H04L 1/0001 |
| | | | 725/111 |
| 2004/0073664 A1 | 4/2004 | Bestermann | |
| 2004/0082203 A1 * | 4/2004 | Logvinov | H04B 3/54 |
| | | | 439/10 |
| 2005/0058082 A1 | 3/2005 | Moran, III et al. | |
| 2005/0123027 A1 * | 6/2005 | Cioffi et al. | 375/222 |
| 2005/0185917 A1 * | 8/2005 | Andrzej | H04N 7/163 |
| | | | 386/218 |
| 2005/0213556 A1 * | 9/2005 | Wax et al. | 370/349 |
| 2005/0259668 A1 * | 11/2005 | Kim | 370/401 |
| 2007/0232289 A1 * | 10/2007 | Tatman et al. | 455/423 |
| 2009/0010251 A1 * | 1/2009 | Bullman et al. | 370/352 |
| 2009/0089852 A1 | 4/2009 | Randolph et al. | |
| 2009/0100492 A1 | 4/2009 | Hicks, III et al. | |
| 2009/0161741 A1 * | 6/2009 | Ginis et al. | 375/224 |
| 2009/0168972 A1 * | 7/2009 | Cioffi et al. | 379/1.04 |
| 2009/0179989 A1 | 7/2009 | Bessone et al. | |
| 2009/0275353 A1 | 11/2009 | Fujita et al. | |
| 2011/0069605 A1 | 3/2011 | Laudel et al. | |
| 2011/0109811 A1 | 5/2011 | Brandsma et al. | |
| 2012/0047525 A1 | 2/2012 | Campagna et al. | |
| 2012/0071200 A1 * | 3/2012 | Bienas | H04W 48/20 |
| | | | 455/525 |
| 2012/0163518 A1 | 6/2012 | Reddy et al. | |
| 2012/0196551 A1 * | 8/2012 | Gomez et al. | 455/226.1 |
| 2012/0213259 A1 * | 8/2012 | Renken | H04N 7/17309 |
| | | | 375/222 |
| 2012/0230186 A1 | 9/2012 | Lee et al. | |
| 2012/0288067 A1 * | 11/2012 | Finkelstein | H04L 25/03885 |
| | | | 379/32.04 |
| 2012/0297427 A1 * | 11/2012 | Chang | H04N 21/43615 |
| | | | 725/70 |
| 2013/0063608 A1 | 3/2013 | Tierney et al. | |
| 2013/0101071 A1 | 4/2013 | Salinger | |
| 2013/0125183 A1 * | 5/2013 | Gomez | H04N 17/00 |
| | | | 725/107 |
| 2015/0082363 A1 | 3/2015 | Gomez et al. | |

OTHER PUBLICATIONS

Non-Final Rejection mailed Dec. 16, 2013 for U.S. Appl. No. 14/029,566, filed Sep. 17, 2013; 17 pages.
Office Action Dated May 23, 2014, in U.S. Appl. No. 14/029,566.
Office Action Dated Apr. 8, 2015, in U.S. Appl. No. 14/029,566.
Chinese Office Action dated Feb. 16, 2015, directed to related CN Application No. 201210451762.4, from the State Intellectual Property Office of the P.R.C. (SIPO); 10 pages.
Office Action dated Sep. 3, 2015 in U.S. Appl. No. 14/029,566, filed Sep. 17, 2013.
Office Action dated Mar. 22, 2016, in the U.S. Appl. No. 14/029,566, filed Sep. 17, 2015.
Office Action dated Oct. 17, 2016, in U.S. Appl. No. 14/029,566, filed Sep. 17, 2015.

* cited by examiner

SPECTRUM ANALYSIS AND PLANT DIAGNOSTIC TOOL FOR COMMUNICATIONS SYSTEMS

CROSS-REFERENCE TO RELATED APPLICATIONS

This patent application claims the benefit of U.S. Provisional Patent Application No. 61/558,735, filed Nov. 11, 2011, and U.S. Provisional Patent Application No. 61/584,476, filed Jan. 9, 2012, each of which is incorporated herein by reference in its entirety.

FIELD OF DISCLOSURE

The disclosure relates to a communication system and more specifically to diagnosing performance problems, or potential performance problems, within the communication system.

BACKGROUND

Related Art

A cable system is a system of providing television, internet data, and/or other services from a cable service provider to cable service subscribers via radio frequency signals transmitted to one or more customer premises through, but not limited to, optical fibers and/or coaxial cables. Performance problems may occur in the cable system which may interrupt and/or degrade the services of the cable service provider from being provided to the cable service subscribers. For example, components within the customer premises, such as components of a cable modem or a set top device, may deteriorate over time thereby preventing a cable service subscriber from receiving the services. As another example, inclement weather may damage a communication cable, such as a fiber optic communication cable or coaxial communication cable, within the cable system thereby preventing a group of cable service subscribers from receiving the services.

In these situations, as well as other situations, the cable service provider receives a service call from one or more of the cable service subscribers indicating that their service has been interrupted or degraded. The cable service provider dispatches technicians, referred to as truck rolls, to various locations within the cable system to locally diagnose and/or locate the cause of the interruption and/or degradation. It is essential that the cable service provider dispatch the technicians to the locations within the cable system that are suffering performance problems. Unnecessarily dispatching technicians to locations within the cable system that are operating properly not only costs money and resources but may lead to unsatisfied subscribers.

However, using the number of service calls as a measure of where to dispatch technicians is highly inefficient. In some situations, not all of the cable service subscribers that are experiencing interruptions or degradations in their services may place service call. In other situations, the performance problem may occur in a communication cable, such as a fiber optic communication cable or coaxial communication cable, which spans for miles, often underground. In these situations, the cable service provider may dispatch more technicians than is necessary as well as potentially dispatch technicians to locations within the cable system that are properly operating. Thus, what is needed is a system and a method to accurately diagnose performance problems of a cable system to overcome the shortcomings stated above.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

The present disclosure allows an operator of a broadcast communication system, such as a cable television or satellite television service to provide some examples, to diagnose performance of this communication system remotely. The present disclosure allows an operator of a first communication device, such as a cable modem termination system (CMTS) to provide an example, to remotely diagnosis performance problems, or potential performance problems, occurring at a second communication device, such as a cable modem (CM) to provide an example, or a group of second communication devices. For example, the operator of the first communication device may view a spectrum analysis of communication signals being routed to, processed by, and/or provided by the second communication device, or group of second communication devices, to diagnose the performance problems, or the potential performance problems, in real time.

Exemplary Communication System

Figure 1:
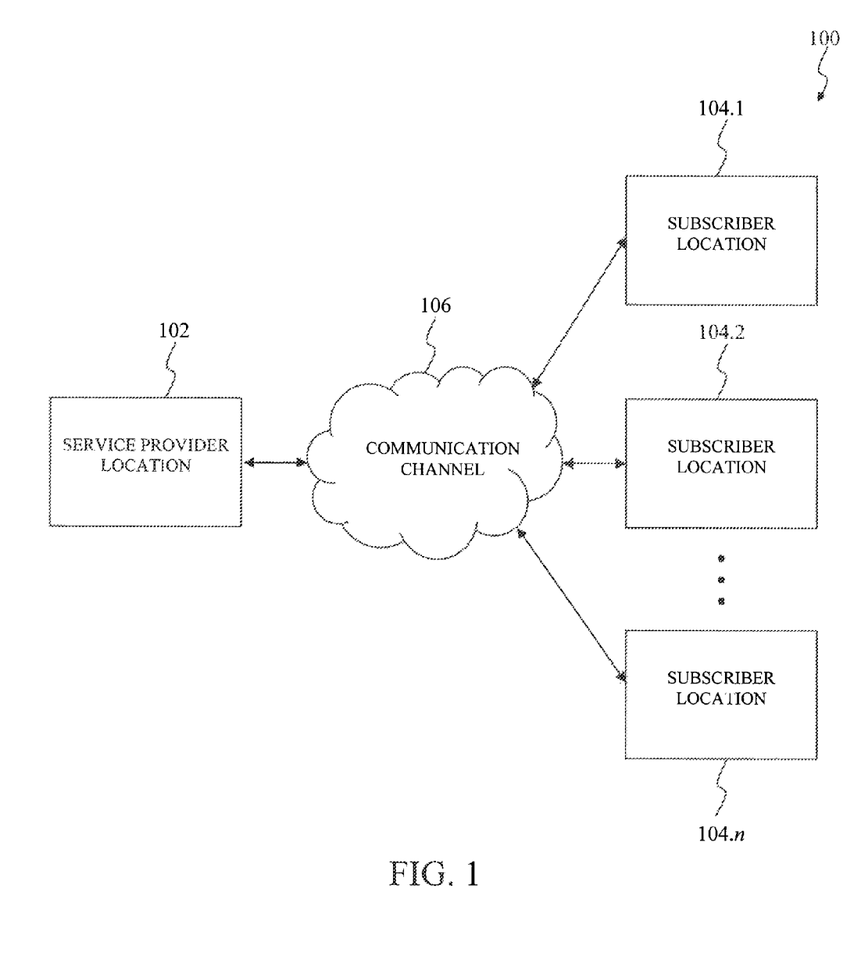
FIG. 1 illustrates a block diagram of an exemplary point-to-multipoint communication system according to an embodiment of the present disclosure.

FIG. 1 illustrates a block diagram of an exemplary point-to-multipoint communication system according to an embodiment of the present disclosure. A communication system 100 facilitates bi-directional communication of information, such as video, audio, and/or data to provide some examples, between a service provider location 102 and one or more subscriber locations 104.1 through 104.n. The communication system 100 may include one of the one or more subscriber locations 104.1 through 104.n to form a point-to-point communication system or more than one of the one or more subscriber locations 104.1 through 104.n to form a point-to-multipoint communication system. As used herein, the terms "downstream," "downlink", "download", or other similar terms refer to the transfer of information in a first direction from the service provider location 102 to the subscriber locations 104.1 through 104.n. The terms "upstream," "uplink", "upload", or other similar terms to the transfer of information in a second direction from subscriber locations 104.1 through 104.n to the service provider location 102.

The service provider location 102 may be characterized as providing a service, such as video, audio, and/or data to provide some examples, to the subscriber locations 104.1 through 104.n. The service provider location 102 manages the upstream and the downstream transfer of the video, audio, and/or data to and/or from the subscriber locations 104.1 through 104.n. The service provider location 102 provides its video, audio, and/or data in the downstream through a communication channel 106 to the subscriber locations 104.1 through 104.n. The communication channel 106 may be characterized as an interface between the service provider location 102 and the subscriber locations 104.1 through 104.n. The communication channel 106 may include, but is not limited to, a microwave radio link, a satellite channel, a fiber optic communication cable, a hybrid fiber optic communication cable system, a copper communication cable, or a concatenation of any combination of these, and including relays and frequency translations, to provide some examples.

The subscriber locations 104.1 through 104.n provide their video, audio, and/or data in the upstream through the communication channel 106 to the service provider location 102. In some situations, problems may arise within the communication system 100 which may prohibit and/or degrade performance of the communication system 100 in transferring the video, audio, and/or data between the service provider location 102 and the subscriber locations 104.1 through 104.n. For example, an inoperative communication link or defective communication cable within the communication channel 106 may prohibit communication between the service provider location 102 and one or more of the subscriber locations 104.1 through 104.n. As another example, components of the subscriber locations 104.1 through 104.n may degrade over time thereby degrading communication between the service provider location 102 and one or more of the subscriber locations 104.1 through 104.n. In other situations, potential problems may arise within the communication system 100 which may prohibit and/or degrade performance of the communication system 100 in transferring the video, audio, and/or data between the service provider location 102 and the subscriber locations 104.1 through 104.n. These potential problems typically have not yet adversely affected the performance of the communication system 100, but may do so in the future.

The communication system 100 includes one or more plant diagnostic tools at various locations within the communication system 100 to allow a service provider to remotely diagnose performance problems, or potential performance problems, within the communication system 100 in real time. For example, the one or more plant diagnostic tools may be implemented as standalone or a discrete devices within the communication system 100 or may be incorporated within or coupled to other devices or hosts, such as the service provider location 102, one or more of the subscriber locations 104.1 through 104.n, and/or the communication channel 106 to provide some examples, within the communication system 100. In this example, the service provider may remotely diagnose performance problems, or potential performance problems, of the communication system 100 using the one or more plant diagnostic tools.

The one or more plant diagnostic tools measure various signal parameters of various signals within the communication system 100 and provide these signal parameters to the service provider location 102. The signal parameters may include one or more of spectral density, received signal strength, relative strength of different channels and services, noise floor and interference, transmitter frequency offsets, and/or any other suitable signal parameter that will be apparent to those skilled in the relevant art(s) without departing from the spirit and scope of the present disclosure. The service provider location 102 may then use these signal parameters to remotely diagnose the performance problems, or the potential performance problems, within the communication system 100 in real time.

Typically, the plant diagnostic tool allows the service provider location 102 to accurately diagnose a location and/or a potential cause of the performance problems, or the potential performance problems. In some situations, the location and/or the potential cause of the performance problems, or the potential performance problems, may be remotely solved using the various signal parameters thereby eliminating the need to dispatch technicians. In other situations, the location and/or the potential cause of the performance problems, or the potential performance problems, may be accurately diagnosed thereby reducing the number of technicians dispatch.

Additionally, various signals within the communication system 100, or portions thereof, and/or one or more of the various signal parameters may be graphically displayed and/or stored onto a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. The graphical display allows an operator of the service provider location 102 to view various signals, or portions thereof, which are traversing throughout the communication system 100 in the time-domain and/or frequency domain. In some situations, the various signal parameters may be farther processed in the time domain and/or the frequency domain before their display and/or storage. The operator of the service provider location 102 may use the graphical display of the various signals, or portions thereof, and/or the one or more of the various signal parameters to analyze performance of the communication system 100 to remotely diagnose performance problems, or the potential performance problems.

Further, the operator of the service provider location 102 may use the various signals within the communication system 100, or portions thereof, and/or the one or more of the various signal parameters to optimize the performance of the communication system 100. For example, the operator of the service provider location 102 may quantify a quality of and/or physical capabilities of the service provider location 102. In this example, the operator of the service provider location 102 may adjust the quality of and/or physical capabilities of the service provider location 102 to adjust performance of the communication system 100. The operator of the service provider location 102 may adjust a frequency allocation, such as a channel-line up to provide an example, of various signals within the communication system 100, a relative power level within one or more channels of the frequency allocation, a frequency of the one or more channels, and/or any other suitable parameter of various signals within the communication system 100 that will be apparent to those skilled in the relevant art(s) without departing from the spirit and scope of the present disclosure.

In some situations, the service provider location 102 may provide testing signals to the subscriber locations 104.1 through 104.n and/or the communication channel 106 to test performance of the communication system 100 to remotely diagnose performance problems, or the potential performance problems. For example, the testing signals may use time-domain reflectometry (TDR) to determine characteristics of the subscriber locations 104.1 through 104.n and/or the communication channel 106. Typically, a sounding source within the service provider location 102 and/or one of the subscriber locations 104.1 through 104.n may provide a sounding signal to a sounding receiver located within one of the subscriber locations 104.1 through 104.n. In some situations, the sounding source and/or the sounding receiver may be implemented as a full-band transmitter and a full-band capture receiver, respectively. In these situations, the full-band transmitter by provide the sounding signal that occupies multiple communication channels with are all received by the full-band capture receiver. The sounding receiver observes echoes caused by the sounding signal to determine a structure of the communication system 100. These echoes are processed in the time domain to accurately diagnose the performance problems or the potential performance problems. As another example, the testing signals may include various broadband and/or narrow band communication signal to measure a response of the communication system 100 to these forms of testing signals. In this other example, the testing signals may represent artificial noise, various sinusoidal waveforms, also referred to as tones, combinations of various sinusoidal waveforms, and/or pseudo-random noise, also referred to as pseudo-noise, that is generated by the service provider location 102.

Cable Communication System

Various plant diagnostic tools within various communication systems are to be described in more detail below. These communication systems are for illustrative purposes only and not limiting. Those skilled in the relevant art(s) will recognize that the various plant diagnostic tools and/or the various spectrum analysis tools, to be described below, may be used in any suitable point-to-point communication system and/or point-to-multipoint communication system without departing from the spirit and scope of the present disclosure. For example, the various plant diagnostic tools and/or the various spectrum analysis tools as to be described herein may be used to diagnose performance problems, or potential performance problems, in any wired communication system, any wireless communication system, or any combination of wired and wireless communication systems.

A cable system is a system of providing television, internet data, and/or other services from a cable service provider to cable service subscribers via radio frequency signals transmitted to one or more customer premises through a communication channel such as, but not limited to, optical fibers and/or coaxial cables. The cable system may utilize Data Over Cable Service Interface Specification (DOCSIS) compliant equipment and protocols to carry out a transfer of information, such as video, audio, and/or data, between one or more cable modems (CMs) at a the one or more customer premises and one or more cable modem termination systems (CMTSs) located at the cable service provider. The DOCSIS Specification generally refers to a group of specifications published by CableLabs® that define industry standards for the CMTS and the CMs. In part, the DOCSIS specification sets forth requirements and objectives for various aspects of cable modem systems including operations support systems, management, data interfaces, as well as network layer, data link layer, and physical layer transport for data over cable systems. The DOCSIS interface specification entitled "Data-Over-Cable Service Interface Specifications, DOCSIS 3.0, MAC and Upper Layer Protocols Interface Specification, CM-SP-MULPIv3.0-I16-110623" is incorporated by reference herein in its entirety.

Figure 2:
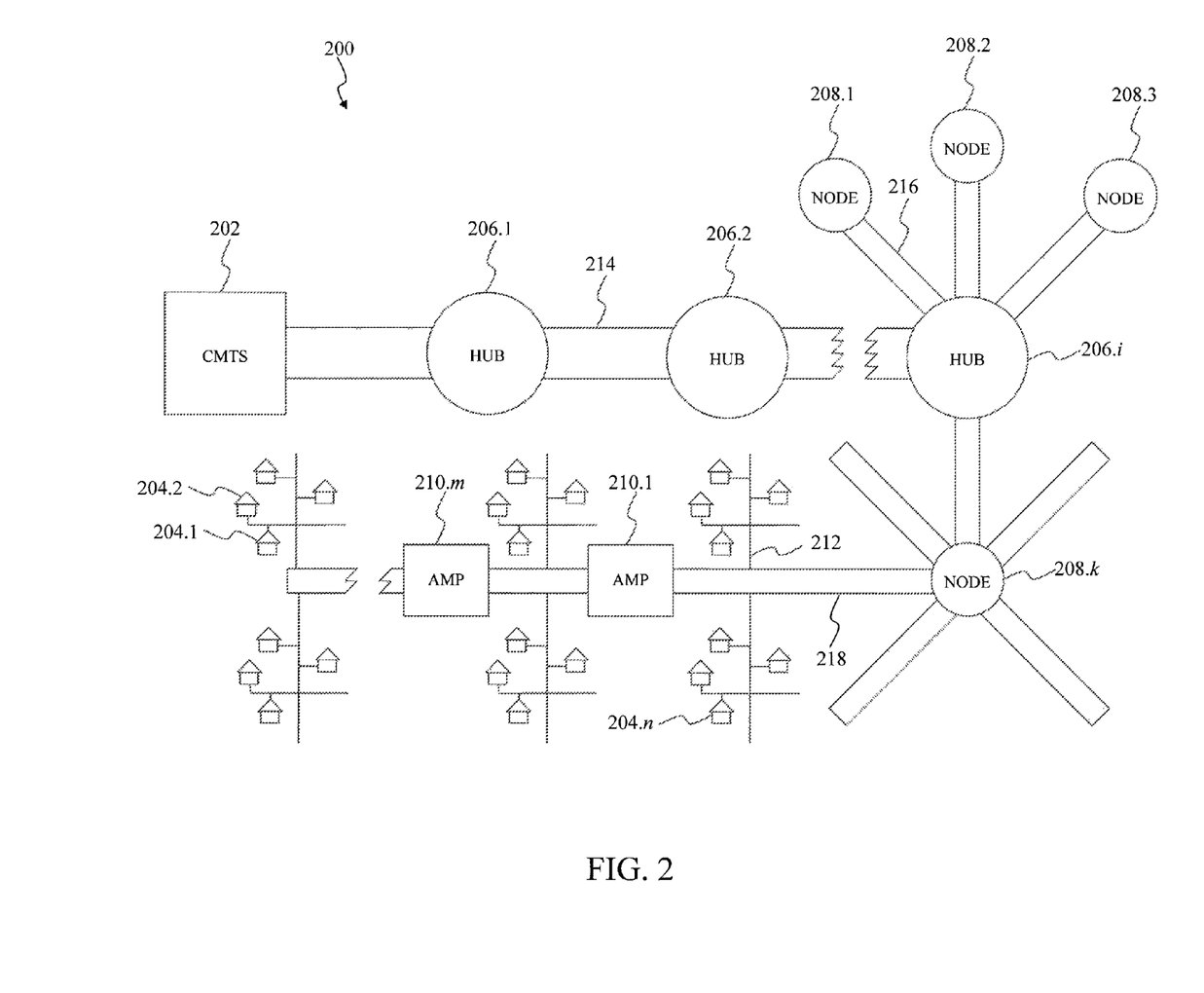
FIG. 2 illustrates a cable system according to an exemplary embodiment of the present disclosure.

FIG. 2 illustrates a cable system according to an exemplary embodiment of the present disclosure. A cable communication system 200 includes a headend having a cable modem termination system (CMTS) 202 that is located at a cable service provider to service one or more cable modems (CMs) located at customer premises 204.1 through 204.$n$. The CMTS 202 facilities bidirectional communication of information, such as video, audio, and/or data, to the one or more cable modems (CMs) located at customer premises 204.1 through 204.$n$ via a hybrid fiber coaxial (HFC) network. The HFC network represents a bidirectional communication network that converts optical communication signals from the CMTS 202 to electrical communication signals for delivery to the customer premises 204.1 through 204.$n$ and/or electrical communication signals from the customer premises 204.1 through 204.$n$ to optical communication signals for delivery to the CMTS 202. Such HFC networks are commonly utilized by the cable service provider to provide Internet access, cable television, pay-per-view, and other services to the customer premises 204.1 through 204.$n$ that will be recognized by those skilled in the relevant art(s) without departing from the spirit and scope of the present disclosure. The cable communication system 200 may represent an exemplary embodiment of the communication system 100.

As shown in FIG. 2, the HFC network includes optical fiber hubs 206.1 through 206.$i$, optical fiber nodes 208.1 through 208.$k$, and optional amplifiers 210.1 through 210.$m$. The configuration and arrangement of the HFC network as shown in FIG. 2 is for illustrative purposes only. Those skilled in the relevant art(s) will recognize that the HFC network may be configured and arranged differently and/or may include any suitable number of optical fiber hubs 206.1 through 206.$i$, optical fiber nodes 208.1 through 208.$k$, and optional amplifiers 210.1 through 210.$m$ without departing from the spirit and scope of the present disclosure.

The optical fiber hubs 206.1 through 206.$i$ are coupled to each other and to the CMTS 202 using a fiber optic communication cable 214. Each of the optical fiber hubs 206.1 through 206.$i$ is typically capable of facilitating communication with approximately 20,000 customer premises 204.1 through 204.$n$. The fiber optic communication cable 214 extending intermediate the CMTS 202 and the optical fiber hubs 206.1 through 206.$i$ defines a fiber ring which is typically capable of facilitating communication between approximately 100,000 customer premises 204.1 through 204.$n$ and the CMTS 202. The optical fiber nodes 208.1 through 208.$k$ are electrically coupled to the optical fiber hubs 206.1 through 206.$i$, typically via various fiber optic communication cables 216. Approximately 500 customer premises 204.1 through 204.$n$ are in electrical communication with the optical fiber nodes 208.1 through 208.$k$, typically via various electrical communication cables 212 and various electrical communication cables 218. The optional amplifiers 210.1 through 210.$m$ facilitate the electrical connection of more distant customer premises 204.1 through 204.$n$ to the optical fiber nodes 208.1 through 208.$k$ by boosting electrical signals traversing through the various electrical communication cables 218 so as to desirably enhance the signal-to-noise ratio of such communication.

The optical fiber hubs 206.1 through 206.$i$, optical fiber nodes 208.1 through 208.$k$, and/or the optional amplifiers 210.1 through 210.$m$ may include one or more plant diagnostic tools to measure various signal parameters of various signals traversing through the cable communication system 200. For example, one or more of the optical fiber hubs 206.1 through 206.$i$ may include one or more plant diagnostic tools to measure various signal parameters of various signals traversing through the fiber optic communication cable 214 and/or the via various fiber optic communication cables 216. As another example, one or more of the optical fiber nodes 208.1 through 208.$k$ may include one or more plant diagnostic tools to measure various signal parameters of various signals traversing through the via various fiber optic communication cables 216 and/or the various electrical communication cables 218. As further example, one or more of the optional amplifiers 210.1 through 210.$m$ may include plant diagnostic tool to measure various signal parameters of various signals traversing through the various electrical communication cables 212 and/or the various electrical communication cables 218. As a yet further example, one or more of the customer premises 204.1 through 204.$n$ may include one or more plant diagnostic tools to measure various signal parameters of various signals traversing through the various electrical communication cables 212. In these examples, the signal parameters may include one or more of spectral density, received signal strength, relative strength of different channels and services, noise floor and interference, transmitter frequency offsets, and/or any other suitable signal parameter that will be apparent to those skilled in the relevant art(s) without departing from the spirit and scope of the present disclosure.

The CMTS 202 may use the various signals, or portions thereof, and/or one or more of the various signal parameters as measured by the one or more plant diagnostic tools within the optical fiber hubs 206.1 through 206.$i$, optical fiber nodes 208.1 through 208.$k$, and/or the optional amplifiers 210.1 through 210.$m$ to remotely diagnose performance problems, or potential performance problems, within the cable communication system 200 in real time. The CMTS 202 may graphically display the various signals, or portions thereof, and/or one or more of the various signal parameters. The graphical display allows an operator of the CMTS 202 to view various signals, or portions thereof, which are traversing throughout the cable communication system 200 in the time-domain and/or frequency domain. Additionally, the CMTS 202 may store the various signals, or portions thereof, and/or the one or more of the various signal parameters onto a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In some situations, the various signal parameters may be further processed in the time domain and/or the frequency domain before their display and/or storage. The operator of the CMTS 202 may use the graphical display of the various signals, or portions thereof, and/or the one or more of the various signal parameters to analyze performance of the cable communication system 200 to remotely diagnose performance problems, or the potential performance problems.

Multimedia Over Coax Alliance (MoCA) Communication System

A home network is a system of providing television, internet data, and/or other services over various coaxial cable infrastructures to connect consumer electronics and home networking devices to a service provider. The home network may utilize Multimedia over Coax Alliance (MoCA) compliant equipment and protocols to carry out a transfer of information, such as video, audio, and/or data, between consumer electronics and home networking devices at a customer premises and headend at a service provider. The MoCA Standard generally refers to a universal standard for home entertainment networking published by Multimedia over Coax Alliance that defines industry standards for home networking.

Figure 3:
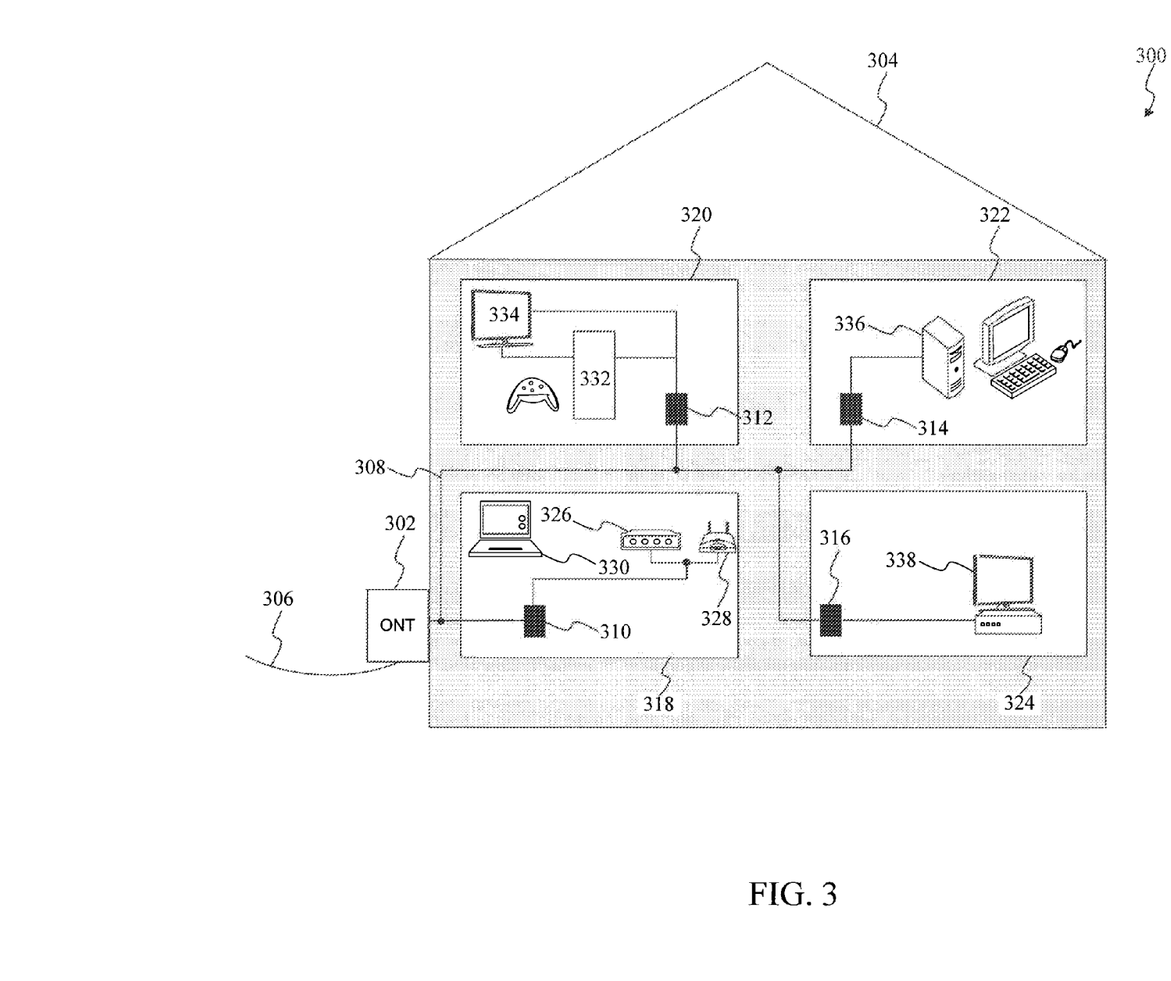
FIG. 3 illustrates an exemplary home network utilizing MoCA compliant equipment and protocols according to an exemplary embodiment of the present disclosure.

FIG. 3 illustrates an exemplary home network utilizing MoCA compliant equipment and protocols according to an exemplary embodiment of the present disclosure. A home communication system 300 includes an optical network terminal (ONT) 302 for communicating information, such as video, audio, and/or data, between at a headend at a service provider and a customer premise 304, such as a home to provide an example, over a fiber optic communication cable 306. However, this example is not limiting, those skilled in the relevant art(s) will recognize that the customer premise 304 may communicate with the service provider using any suitable wired communication, wireless communication, or any combination of wired and wireless communication that will be apparent without departing from the spirit and scope of the present disclosure. The home communication system 300 may represent an exemplary embodiment of the communication system 100.

As shown in FIG. 3, the fiber optic communication cable 306 carries the information between the headend and the ONT 302 at the customer premise 304. The ONT 302 converts fiber optical communication signals from the headend to electrical communication signals for the customer premise 304 and/or electrical communication signals from the customer premise 304 to fiber optical communication signals for the headend. One or more electrical communication cables 308, such as one or more copper communication cables and/or one or more coaxial communication cables to provide some examples, couple the ONT 302 to MoCA adapters 310 through 316. Although the MoCA adapters 310 through 316 are shown as separate devices in FIG. 3, those skilled in the relevant art(s) will recognize that the MoCA adapters 310 through 316 may be implemented into other hardware, such as a cable set top box to provide an example, with departing from the spirit and scope of the present disclosure.

The MoCA adapters 310 through 316 provide television, internet data, and/or other services to various consumer electronics and/or home networking devices within various rooms 318 through 324 of the customer premise 304. It should be noted that the number of rooms and/or MoCA adapters as shown in FIG. 3 are for illustrative purposes only, those skilled in the relevant art(s) will recognize that a different number of rooms and/or MoCA adapters may be within the customer premise 304 without departing from the spirit and scope of the present disclosure.

The MoCA adapter 310 within the room 318 couples to a cable modem 326 and a wireless router 328, which in turn, provides wireless access to a portable computer 330. Similarly, the MoCA adapter 312 within the room 320 couples to a video game console 332 and a television 334 to provide wireless access to the video game console 332 and the television 334. Likewise, the MoCA adapter 314 within the room 322 and the MoCA adapter 316 within the room 324 couple to a personal computer 336 and a personal computer 338, respectively. The MoCA adapters 310 through 316 are configured and arranged to form a home network allowing the cable modem 326, the wireless router 328, the portable computer 330, the video game console 332, the television 334, the personal computer 336, and/or the personal computer 338 to communicate amongst themselves as well as with service provider via the ONT 302. It should be noted that the consumer electronics and/or home networking devices within the customer premise 304 as shown in FIG. 3 is for illustrative purposes only, those skilled in the relevant art(s) will recognize that other consumer electronics and/or home networking devices may be within the customer premise 304 without departing from the spirit and scope of the present disclosure.

The ONT 302 and/or the MoCA adapters 310 through 316 may include one or more plant diagnostic tools to measure various signal parameters of various signals traversing through the home communication system 300. For example, the ONT 302 may include one or more plant diagnostic tools to measure various signal parameters of various signals traversing through the fiber optic communication cable 306 and/or the one or more electrical communication cables 308. As another example, one or more of the MoCA adapters 310 through 316 may include one or more plant diagnostic tools to measure various signal parameters of various signals traversing through the fiber optic communication cable 306 and/or the one or more electrical communication cables 308. In these examples, the signal parameters may include one or more of spectral density, received signal strength, relative strength of different channels and services, noise floor and interference, transmitter frequency offsets, and/or any other suitable signal parameter that will be apparent to those skilled in the relevant art(s) without departing from the spirit and scope of the present disclosure.

An operator of the headend may use the various signals, or portions thereof, and/or one or more of the various signal parameters as measured by the one or more plant diagnostic tools within the ONT 302 and/or the MoCA adapters 310 through 316 to remotely diagnose performance problems, or potential performance problems, within the home communication system 300 in real time. The service provider may graphically display the various signals, or portions thereof, and/or one or more of the various signal parameters. The graphical display allows an operator of the headend to view various signals, or portions thereof, which are traversing throughout the home communication system 300 in the time-domain and/or frequency domain. Additionally, the headend may store the various signals, or portions thereof, and/or the one or more of the various signal parameters onto a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In some situations, the various signal parameters may be further processed in the time domain and/or the frequency domain before their display and/or storage. The operator of the headend may use the graphical display of the various signals, or portions thereof, and/or the one or more of the various signal parameters to analyze performance of the home communication system 300 to remotely diagnose performance problems, or the potential performance problems.

An Exemplary Plant Diagnostic Tool for Communication Systems

Figure 4:
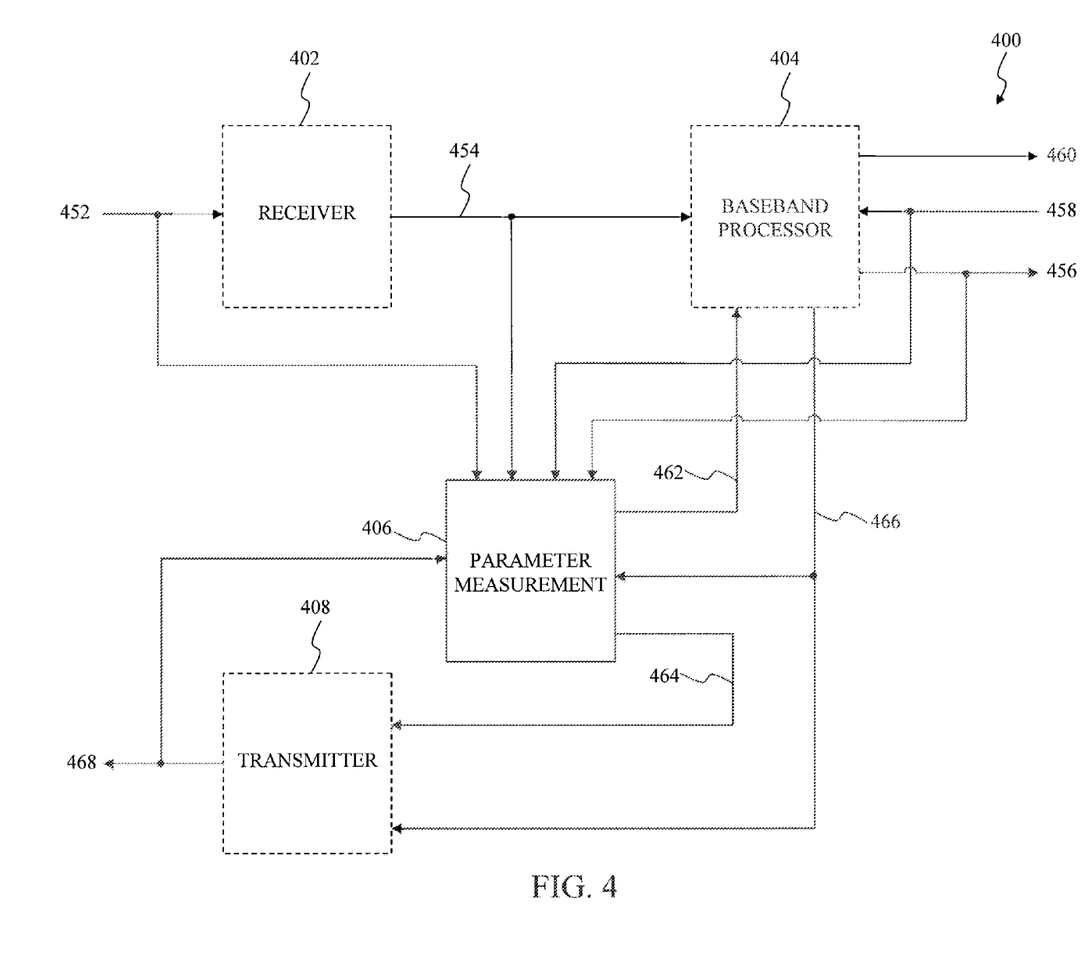
FIG. 4 illustrates an exemplary plant diagnostic tool that may be implemented at various locations within a communication system according to an exemplary embodiment of the present disclosure.

FIG. 4 illustrates an exemplary plant diagnostic tool that may be implemented at various locations within a communication system according to an exemplary embodiment of the present disclosure. A plant diagnostic tool 400 may be positioned at various locations within a communication system, such as the communication system 100, the cable communication system 200, the home communication system 300, or any other suitable wired and/or wireless communication system to provide some examples, to measure various signal parameters of various signals traversing through the communication system. The communication system may include one or more plant diagnostic tools 400 to measure various signal parameters of various signals traversing through the communication system. The plant diagnostic tool 400 may be implemented as a standalone or a discrete device within the communication system or may be incorporated within or coupled to other devices or hosts within the communication system. An operator at a service provider may use various signals, or portions thereof, and/or one or more of the various signal parameters as measured by the plant diagnostic tool 400 to remotely diagnose performance problems, or potential performance problems, within the communication system in real time.

Generally, the plant diagnostic tool 400 includes a receiver 402, a baseband processor 404, a parameter measurement module 406, and a transmitter 408. However, those skilled in the relevant art(s) will recognize that one or more of the receiver 402, the baseband processor 404, and the transmitter module 408 may be optional without departing from the spirit and scope of the present disclosure.

The receiver 402 receives a received communication signal 452 that is traversing through the communication system. The received communication signal 452 may represent a wired and/or a wireless communication signal. The receiver 402 may process the received communication signal 452 to provide a received sequence of data 454. This processing may include amplifying, filtering, downconverting, demodulating, and/or decoding of the received communication signal 452. This processing may also include conversion of the received communication signal 452 from a first representation, such as an optical signal or an analog representation to provide some examples, to a second representation, such as an electrical signal or a digital representation to provide some examples. For example, the receiver 402 may be characterized as being a wide-band and/or full band capture receiver. In this example, the receiver 402 can include a wide-band capture analog digital converter (ADC) that is capable of converting multiple channels and/or services within the received communication signal 452 from a representation in the analog domain to a representation in the digital domain. Alternatively, in this example, the wide-band capture ADC represents a full band ADC that is capable of converting each of the channels and/or services, referred to as full band capture, within the received communication signal into the digital representation.

The baseband processor 404 may process the received sequence of data 454 to provide a recovered sequence of data 456 for one or more devices of the communication system. Additionally, the baseband processor 404 may process a received sequence of data 458 from the one or more devices of the communication system to provide a transmission sequence of data 466. These devices may include personal computers, data terminal equipment, telephony devices, broadband media players, personal digital assistants, software applications, hubs, nodes, cable modems, cable modem termination systems, various adapters, and/or any other device that is capable of transmitting and/or receiving information within the communication system that will be apparent to those skilled in the relevant art(s) without departing from the spirit and scope of the present disclosure. Typically, the baseband processor 404 may process the received sequence of data 454 and/or the received sequence of data 458 in accordance with a communication standard, such as the DOCSIS Specification and/or the MoCA Standard to provide some examples.

Additionally, the baseband processor 404 may provide one or more signal parameters 460 to allow technicians dispatched by the service provider to locally diagnose performance problems, or potential performance problems, within the communication system in real time. The baseband processor 404 may process one or more signal parameters 462 from the parameter measurement module 406 to reconstruct various signals, or portions thereof, that are traversing throughout the communication system. The baseband processor 404 may provide the various signals, or the portions thereof, and/or the one or more signal parameters as the one or more signal parameters 460. The one or more signal parameters 460 to allow technicians to view the various signals, or the portions thereof, and/or the one or more signal parameters to locally diagnose performance problems, or potential performance problems, within the communication system in real time. For example, the technicians may simply display the one or more signal parameters 460 onto a diagnostic display, such a video panel, or a liquid crystal display to provide some examples, to locally diagnose the performance problems, or the potential performance problems, of the communication system in real time. As another example, the technicians may provide the one or more signal parameters 460 to a computing system, such as a mobile device, a smart phone, a laptop computer to provide some examples, to perform additional processing in the time domain and/or the frequency domain on the one or more signal parameters 460. In this other example, the computing system may additionally provide the or more signal parameters 460 before or after being processed to the service provider.

The parameter measurement module 406 estimates one or more signal parameters of one or more signals within the plant diagnostic tool 400. These one or more signals may include the received communication signal 452, the received sequence of data 454, the recovered sequence of data 456, the received sequence of data 458, the transmission sequence of data 466, a transmitted communication signal 468, and/or any other suitable signal within the plant diagnostic tool 400 that will be apparent to those skilled in the relevant art(s) without departing from the spirit and scope of the present disclosure. The one or more signal parameters may include a spectral density, a received signal strength, a relative strength of different channels and services, noise floor and interference, transmitter frequency offset, and/or any other suitable parameter that will be recognized by those skilled in the relevant art(s) without departing from the spirit and scope of the present disclosure.

The parameter measurement module 406 may provide the one or more signal parameters themselves, or indications of the one or more signal parameters, as one or more signal parameters 462 which are in turn processed by the baseband processor 404. The baseband processor 404 may process the one or more signal parameters 462 in the time domain and/or the frequency domain to provide these processed parameters as the one or more signal parameters 460 and/or the transmission sequence of data 466. For example, the baseband processor 404 may format the one or more signal parameters 462 into a header portion or a data portion of a data packet and provide this data packet as the transmission sequence of data 466. The parameter measurement module 406 may additionally provide the one or more signal parameters, or the indications of the one or more signal parameters, as one or more signal parameters 464 which are in turn provided to the service provider by the transmitter 408 to remotely diagnose performance problems, or potential performance problems, within the communication system in real time.

The transmitter 408 processes the one or more signal parameters 464 and/or the transmission sequence of data 466 to provide the transmitted communication signal 468. The transmitted communication signal 468 may represent a wired and/or a wireless communication signal that is provided to the communication system. In an exemplary embodiment, the transmitted communication signal 468 may include an in-band portion that is primarily for transmission of the transmission sequence of data 466 and an out-of-band portion that is primary for transmission of one or more signal parameters 464. In this exemplary embodiment, the in-band portion and the out-of-band portion of the transmission sequence of data 466 may be determined in accordance with the communication standard. The processing of the one or more signal parameters 464 and/or the transmission sequence of data 466 may include amplifying, filtering, upconverting, modulating, and/or encoding. This processing may also include conversion of the one or more signal parameters 464 and/or the transmission sequence of data 466 from a first representation, such as an electrical signal or a digital representation to provide some examples, to a second representation, such as an optical signal or an analog representation to provide some examples.

In some embodiments, a sounding source and/or a sounding receiver may be implemented as part of the plant diagnostic tool 400. Optionally, the sounding source may share physical hardware with the transmitter 408 and/or the sounding receiver may share physical hardware with the receiver 402.

An Exemplary Spectrum Analysis Tool for Communication Systems

Figure 5:
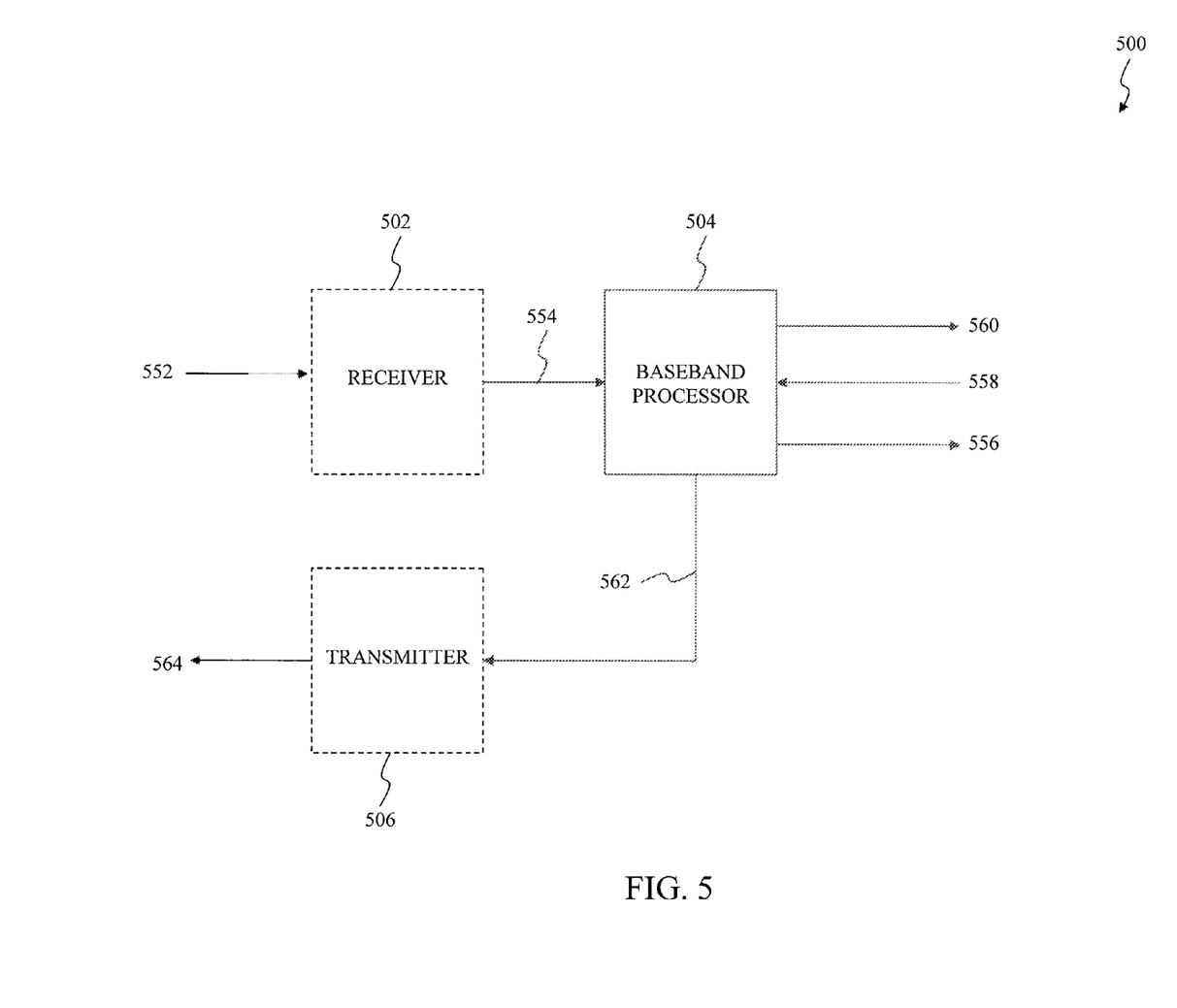
FIG. 5 illustrates a block diagram of an exemplary spectrum analysis tool for communication systems according to an exemplary embodiment of the disclosure.

FIG. 5 illustrates a block diagram of an exemplary spectrum analysis tool for communication systems according to an exemplary embodiment of the disclosure. A spectrum analysis tool 500 may use various signal parameters of various signals as measured by one or more plant diagnostic tools, such as one or more of the plant diagnostic tools 400 to provide an example, that may be positioned at various locations within a communication system, such as the communication system 100, the cable communication system 200, the home communication system 300, or any other suitable wired and/or wireless communication system to provide some examples, to remotely diagnose performance problems, or potential performance problems, within the communication system in real time. The spectrum analysis tool 500 may display and/or store these signal parameters, or the various signal signals themselves to allow an operator of spectrum analysis tool 500 to view various signals, or portions thereof, which are traversing throughout the communication environment in the time-domain and/or frequency domain. The display and/or storage of these signal parameters as well as the various signals themselves allow the operator to remotely and accurately diagnose the location and/or cause of performance problems, or potential performance problems. In some situations, the potential cause of the performance problems may be remotely solved using the various signal parameters without any truck rolls being dispatched by the operator. In other situations, the spectrum analysis tool 500 allows the operator to accurately diagnose the location and/or the potential cause of the performance problems thereby reducing the number of technicians dispatched by the operator.

The spectrum analysis tool 500 may be implemented as a standalone or a discrete device within the communication system or may be incorporated within or coupled to other devices or hosts within the communication system. For example, the spectrum analysis tool 500 may be implemented as part of the service provider equipment or may be a standalone device that is coupled to the subscriber equipment.

Generally, the spectrum analysis tool 500 includes a receiver 502, a baseband processor 504, a user interface 506, and a transmitter 506. However, those skilled in the relevant art(s) will recognize that one or more of the receiver 502, the baseband processor 504, and the transmitter module 508 may be optional without departing from the spirit and scope of the present disclosure.

The receiver 502 receives a received communication signal 552 that is traversing through the communication system. The received communication signal 552 may represent a wired and/or a wireless communication signal that is traversing through the communication system. The receiver 502 may process the received communication signal 552 to provide a received sequence of data 554. This processing may include amplifying, filtering, downconverting, demodulating, and/or decoding of the received communication signal 552. This processing may also include conversion of the received communication signal 552 from a first representation, such as an optical signal or an analog representation to provide some examples, to a second representation, such as an electrical signal or a digital representation to provide some examples. For example, the receiver 502 may include a wide-band capture analog digital converter (ADC) that is capable of converting multiple channels and/or services within the received communication signal 552 from a representation in the analog domain to a representation in the digital domain. As another example, the wide-band capture ADC represents a full band ADC that is capable of converting each of the channels and/or services, referred to as full band capture, within the received communication signal into the digital representation.

The baseband processor 504 may process the received sequence of data 554 to provide a recovered sequence of data 556 for one or more devices of the communication system. Additionally, the baseband processor 504 may process a received sequence of data 558 from the one or more devices of the communication system to provide a transmission sequence of data 562. These devices may include personal computers, data terminal equipment, telephony devices, broadband media players, personal digital assistants, software applications, hubs, nodes, cable modems, cable modem termination systems, various adapters, and/or any other device that is capable of transmitting and/or receiving information within the communication system that will be apparent to those skilled in the relevant art(s) without departing from the spirit and scope of the present disclosure. Typically, the baseband processor 504 may process the received sequence of data 554 and/or the received sequence of data 558 in accordance with a communication standard, such as the DOCSIS Specification and/or the MoCA Standard to provide some examples.

Additionally, the baseband processor 504 may process one or more signal parameters from one or more plant diagnostic tools elsewhere within the communication system that are embedded within the received communication signal 552 and/or the received sequence of data 558 to reconstruct various signals, or portions thereof, that are traversing throughout the communication system. The baseband processor 504 may provide the various signals, or the portions thereof, and/or the one or more signal parameters as one or more signal parameters 560. The one or more signal parameters 560 to allow operators of the spectrum analysis tool 500 to view the various signals, or the portions thereof, and/or the one or more signal parameters to remotely diagnose performance problems, or potential performance problems, within the communication system in real time.

The transmitter 506 processes the transmission sequence of data 562 to provide the transmitted communication signal 568. The transmitted communication signal 568 may represent a wired and/or a wireless communication signal that is provided to the communication system. The processing of the transmission sequence of data 562 may include amplifying, filtering, upconverting, modulating, and/or encoding. This processing may also include conversion of the transmission sequence of data 562 from a first representation, such as an electrical signal or a digital representation to provide some examples, to a second representation, such as an optical signal or an analog representation to provide some examples.

In some embodiments, the sounding source may be implemented as part of the spectrum analysis tool 500. Optionally, the sounding source may share physical hardware with the transmitter 506.

CONCLUSION

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments.

What is claimed is:

1. A diagnostic device for a communication system, the diagnostic device comprising:
   a receiver configured to:
      process a received communication signal comprising a plurality of communication channels, and
      convert each of the plurality of communication channels from an analog representation to a digital representation to provide a received sequence of data;
   a parameter measurement module comprising hardware and configured to estimate one or more signal parameters associated with the received communication signal, the one or more signal parameters being used by a service provider location of the communication system to reconstruct the received communication signal; and
   a transmitter configured to process the one or more signal parameters for transmission to the service provider location to provide a transmitted communication signal.

2. The diagnostic device of claim 1, wherein the one or more signal parameters comprise at least one selected from a group consisting of:
   spectral density of signals;
   received signal strength;
   relative strength of different channels and services;
   noise floor and interference; and
   transmitter frequency offsets.

3. The diagnostic device of claim 1, wherein the receiver comprises a wide-band capture receiver.

4. The diagnostic device of claim 3, wherein the received communication signal is a wide-band communication signal, and
   wherein the parameter measurement module is further configured to use the wide-band communication signal to estimate the one or more signal parameters.

5. The diagnostic device of claim 1, wherein the receiver comprises a full-band capture receiver.

6. The diagnostic device of claim 5, wherein the received communication signal is a full-band communication signal, and
   wherein the parameter measurement module is further configured to use the full-band communication signal to estimate the one or more signal parameters.

7. A diagnostic device for a communication system, the diagnostic device comprising:
   a receiver configured to process a received communication signal to provide a received sequence of data;
   a parameter measurement module comprising hardware and configured to estimate one or more signal parameters associated with the received communication signal, the one or more signal parameters being used by a service provider location of the communication system to reconstruct the received communication signal;
   a transmitter configured to process the one or more signal parameters for transmission to the service provider location to provide a transmitted communication signal; and
   a baseband processor configured to process the received sequence of data to provide a recovered sequence of data.

8. The diagnostic device of claim 7, wherein the baseband processor is further configured to process a second received sequence of data from one or more devices to provide a transmission sequence of data, wherein the transmitter is further configured to process the transmission sequence of data to provide the transmitted communication signal.

9. The diagnostic device of claim 8, wherein the transmitted communication signal includes an in-band portion and an out-of-band portion, the transmitter being further configured to transmit the transmission sequence of data using the in-band portion and the one or more signal parameters using the out-of-band portion.

10. The diagnostic device of claim 8, wherein the second received sequence of data comprises a header portion and a data portion, the baseband processor being further configured to format the one or more signal parameters into the header portion.

11. The diagnostic device of claim 7, wherein the receiver comprises a wide-band capture receiver.

12. The diagnostic device of claim 11, wherein the received communication signal is a wide-band communication signal, and
   wherein the parameter measurement module is further configured to use the wide-band communication signal to estimate the one or more signal parameters.

13. The diagnostic device of claim 7, wherein the receiver comprises a full-band capture receiver.

14. The diagnostic device of claim 13, wherein the received communication signal is a full-band communication signal, and
   wherein the parameter measurement module is further configured to use the full-band communication signal to estimate the one or more signal parameters.

15. A diagnostic device for a communication system, the diagnostic device comprising:
   a receiver configured to process a received communication signal to provide a received sequence of data;
   a parameter measurement module comprising hardware and configured to estimate one or more signal parameters associated with the received communication signal, the one or more signal parameters being used by a service provider location of the communication system to reconstruct the received communication signal; and a transmitter configured to process the one or more signal parameters for transmission to the service provider location to provide a transmitted communication signal, wherein the received communication signal comprises a sounding signal provided by the service provider location to determine characteristics of the communication system.

16. The diagnostic device of claim 15, wherein the receiver comprises a wide-band capture receiver.

17. The diagnostic device of claim 16, wherein the received communication signal is a wide-band communication signal, and wherein the parameter measurement module is further configured to use the wide-band communication signal to estimate the one or more signal parameters.

18. The diagnostic device of claim 15, wherein the receiver comprises a full-band capture receiver.

19. The diagnostic device of claim 18, wherein the received communication signal is a full-band communication signal, and wherein the parameter measurement module is further configured to use the full-band communication signal to estimate the one or more signal parameters.

20. A spectrum analysis device for a communication system, the spectrum analysis device comprising:

a wide-band capture receiver configured to:
process a received communication signal comprising a plurality of communication channels, and
convert more than one of the plurality of communication channels from an analog representation to a digital representation to provide a received sequence of data; and a baseband processor configured to process one or more signal parameters associated with the received sequence of data to reconstruct at least a portion of the received communication signal.

21. The spectrum analysis device of claim 20, wherein the wide-band capture receiver comprises a full-band capture receiver further configured to convert the plurality of communication channels from an analog, representation to a digital representation to provide the received sequence of data.

22. A spectrum analysis device for a communication system, the spectrum analysis device comprising:

a receiver configured to process a received communication signal to provide a received sequence of data;

a baseband processor configured to process one or more signal parameters associated with the received sequence of data to reconstruct at least a portion of the received communication signal; and a display configured to display at least the portion of the received communication signal in a frequency domain or a time domain.

23. The spectrum analysis device of claim 22, wherein the receiver comprises a wide-band capture receiver.

24. The spectrum analysis device of claim 22, wherein the receiver comprises a full-band capture receiver.

25. A spectrum analysis device for a communication system, the spectrum analysis device comprising:

a receiver configured to process a received communication signal to provide a received sequence of data; and a baseband processor configured to process one or more signal parameters associated with the received sequence of data to reconstruct at least a portion of the received communication signal, wherein the baseband processor is further configured to process the received sequence of data to provide a recovered sequence of data.

26. The spectrum analysis device of claim 25, wherein the receiver comprises a wide-band capture receiver.

27. The spectrum analysis device of claim 25, wherein the receiver comprises a full-band capture receiver.

28. A communication system comprising a service provider location coupled to a subscriber location via a communication channel, the communication system comprising:

a diagnostic device, disposed at the subscriber location, comprising:
a receiver configured to:
process a received communication signal comprising a plurality of communication channels, and
convert each of the plurality of communication channels from an analog representation to a digital representation to provide a received sequence of data;

a parameter measurement module comprising hardware and configured to estimate a signal parameter associated with the received communication signal, the signal parameter being used by the service provider location to reconstruct the received communication signal; and a transmitter configured to process the signal parameter for transmission to the service provider location to provide a transmitted communication signal; and a spectrum analysis device, disposed at the service provider location, configured to process the signal parameter to reconstruct, at least, a portion of the received communication signal.

29. The communication system of claim 24, wherein the received communication signal comprises a sounding signal.

30. The communication system of claim 29, wherein the subscriber location comprises a sounding source and a sounding receiver.

31. The communication system of claim 29, wherein the service provider location comprises a sounding source, and wherein the subscriber location comprises a sounding receiver.

32. The communication system of claim 28, wherein the communication system comprises a wired communication system.

33. The communication system of claim 32, wherein the wired communication system comprises a Data Over Cable Service Interface Specification (DOCSIS) compliant communication system.

34. The communication system of claim 28, wherein the communication system comprises a wireless communication system.

35. The communication system of claim 28, wherein the receiver comprises a wide-band capture receiver.

36. The communication system of claim 35, wherein the received communication signal is a wide-band communication signal, and wherein the parameter measurement module is further configured to use the wide-band communication signal to estimate the one or more signal parameters.

37. The communication system of claim 28, wherein the receiver comprises a full-band capture receiver.

38. The communication system of claim 37, wherein the received communication signal is a full-band communication signal, and wherein the parameter measurement module is further configured to use the full-band communication signal to estimate the one or more signal parameters.

39. A communication system comprising a service provider location coupled to a subscriber location via a communication channel, the communication system comprising:

a diagnostic device, disposed at the subscriber location, configured to estimate a signal parameter of a signal received at the subscriber location; and a spectrum analysis device, disposed at the service provider location, comprising:

a receiver configured to process the signal received at the subscriber location to provide a received sequence of data;

a baseband processor configured to process one or more signal parameters within the received sequence of data to reconstruct at least a portion of the signal received at the subscriber location; and, a display configured to display at least the portion of the signal received at the subscriber location in a frequency domain or a time domain.

40. The communication system of claim 39, wherein the receiver comprises a wide-band capture receiver.

41. The communication system of claim 39, wherein the receiver comprises a full-band capture receiver.

* * * * *

UNITED STATES PATENT AND TRADEMARK OFFICE
CERTIFICATE OF CORRECTION

PATENT NO. : 9,686,594 B2
APPLICATION NO. : 13/435433
DATED : June 20, 2017
INVENTOR(S) : Gomez et al.

It is certified that error appears in the above-identified patent and that said Letters Patent is hereby corrected as shown below:

In the Claims

In Column 18, Line 39, replace "claim 24" with --claim 28--.

Signed and Sealed this
Tenth Day of April, 2018

Andrei Iancu
*Director of the United States Patent and Trademark Office*